United States Patent
Oyaizu et al.

(10) Patent No.: US 8,739,836 B2
(45) Date of Patent: Jun. 3, 2014

(54) REFRIGERANT-TRANSPORTING HOSE

(71) Applicant: Tokai Rubber Industries, LTD., Komaki (JP)

(72) Inventors: Naoki Oyaizu, Komaki (JP); Kazutaka Katayama, Komaki (JP); Takehiko Taguchi, Komaki (JP); Hiroyoshi Mori, Komaki (JP); Eiichi Daikai, Komaki (JP); Yukinori Wakazono, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 13/672,775

(22) Filed: Nov. 9, 2012

(65) Prior Publication Data

US 2013/0061974 A1   Mar. 14, 2013

Related U.S. Application Data

(63) Continuation of application No. PCT/JP2011/069506, filed on Aug. 30, 2011.

(30) Foreign Application Priority Data

Oct. 8, 2010  (JP) .................................. 2010-228346

(51) Int. Cl.
*F16L 11/00* (2006.01)

(52) U.S. Cl.
USPC ........... 138/126; 138/137; 138/141; 138/146; 137/36.91

(58) Field of Classification Search
USPC ................ 138/137, 141, 140, 126; 428/36.91
See application file for complete search history.

(56) References Cited

U.S. PATENT DOCUMENTS

| | | | | |
|---|---|---|---|---|
| 5,076,329 A | * | 12/1991 | Brunnhofer | 138/137 |
| 5,167,259 A | * | 12/1992 | Brunnhofer | 138/137 |
| 5,799,704 A | * | 9/1998 | Andre | 138/137 |
| 5,957,164 A | | 9/1999 | Campbell | |
| 6,062,269 A | | 5/2000 | Tanaka et al. | |
| 6,068,026 A | * | 5/2000 | Garois | 138/126 |
| 6,179,008 B1 | * | 1/2001 | Kawazura et al. | 138/125 |
| 7,132,141 B2 | * | 11/2006 | Thullen et al. | 428/36.91 |

(Continued)

FOREIGN PATENT DOCUMENTS

| | | |
|---|---|---|
| CN | 1314979 A | 9/2001 |
| JP | 2001-050434 A | 2/2001 |
| JP | 2008-507436 A | 3/2008 |
| WO | 97/31212 A1 | 8/1997 |

OTHER PUBLICATIONS

International Search Report of PCT/JP2011/069506, mailing date of Nov. 29, 2011.

(Continued)

*Primary Examiner* — Patrick F. Brinson
(74) *Attorney, Agent, or Firm* — Westerman, Hattori, Daniels & Adrian, LLP

(57) ABSTRACT

A refrigerant-transporting hose includes a tubular inner layer 1 in contact with a fluorine refrigerant, an intermediate layer 2 formed on an outer periphery surface thereof, and at least one rubber layer 3 and 5 formed on a further outer periphery thereof, and the inner layer 1 is made of a inner layer material including maleic anhydride-modified polypropylene as a main component and the intermediate layer 2 is made of a intermediate layer material including polyamide resin as a main component.

20 Claims, 1 Drawing Sheet

(56) References Cited

U.S. PATENT DOCUMENTS

2007/0148388 A1    6/2007  Kuhmann et al.
2010/0300571 A1*  12/2010  Miller et al. .................. 138/137
2011/0139258 A1*  6/2011  Doshi ............................... 137/1

OTHER PUBLICATIONS

Chinese Office Action dated Nov. 5, 2013, issued in corresponding Chinese Patent Application No. 201180005142.1, w/ partial English translation.

* cited by examiner

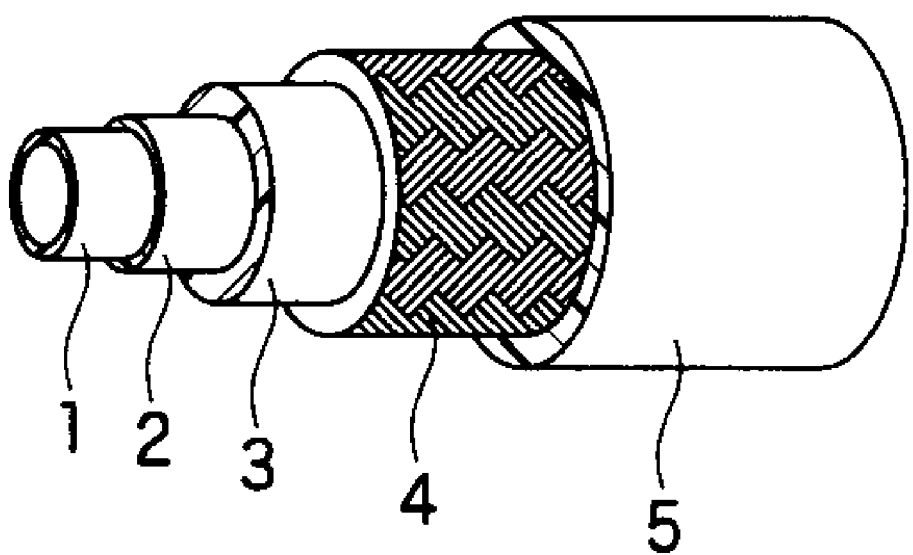

REFRIGERANT-TRANSPORTING HOSE

TECHNICAL FIELD

The present invention relates to a refrigerant-transporting hose such as an air conditioner hose. More particularly, the present invention relates to a refrigerant-transporting hose that can transport a fluorine refrigerant such as Freon (R12) and alternative Freon (for example, a single refrigerant R-134a and a mixed refrigerant Fluid H) and is used as a piping hose in an automobile engine room and the like.

BACKGROUND OF THE INVENTION

Generally, in a refrigerant-transporting hose used as a piping hose in an automobile engine room, a fluorine refrigerant such as Freon (R12) and alternative Freon (such as R-134a) is used. In recent years, since the regulation on transpiration of ozone layer depleting gas is tightened, requirements on refrigerant permeability of a refrigerant hose for an automobile have become strict; therefore, resin having high crystallinity such as polyamide resin is used as a material for an inner layer of a refrigerant-transporting hose. As such a refrigerant-transporting hose, for example, there is proposed a hose having an inner layer made of polyamide resin and an outer layer made of a polypropylene/butyl rubber alloy material, formed by bonding the both layers with an adhesive (see International Publication No. 97/31212).

CITATION LIST

Patent Literature

Patent Literature 1: International Publication No. 97/31212

A fluorine refrigerant such as Freon is degraded due to long term use and generates acid. The acid decomposes amide bonds in polyamide resin. Therefore, there is a problem that a hose is broken when the hose is bent. In recent years, in order to improve cooling efficiency, a refrigerant-transporting hose is likely to be used under higher temperature conditions. As a result, decomposition of amide bonds is more likely to be accelerated, facilitating cracking of the hose. A refrigerant-transporting hose described in the Patent Literature 1 has poor adhesiveness between an inner layer made of polyamide resin and an outer layer made of a polypropylene/butyl rubber alloy material. Therefore, the use of an adhesive is necessary to bond the both layers, while having drawbacks in terms of cost, workability, and the like.

The present invention has been made in consideration of such a situation, and aims to provide a refrigerant-transporting hose that can prevent cracking of the hose while having excellent acid resistance property and excellent interlayer adhesiveness.

SUMMARY OF THE INVENTION

In order to achieve the above object, a refrigerant-transporting hose according to the present invention includes a tubular inner layer in contact with a fluorine refrigerant, an intermediate layer formed on an outer periphery surface thereof, and at least one rubber layer formed on a further outer periphery thereof, in which the inner layer is made of a inner layer material including maleic anhydride-modified polypropylene as a main component and the intermediate layer is made of a intermediate layer material including polyamide resin as a main component.

That is, the present inventors have intensively researched focusing on an inner layer in contact with a fluorine refrigerant in order to obtain a refrigerant-transporting hose (excellent in bend resistance property) that can prevent cracking of the hose while having excellent acid resistance property and excellent interlayer adhesiveness without using an adhesive. In course of the research, the present inventors focused on polypropylene that has better acid resistance property than polyamide resin, and came up with an idea of forming a layer (innermost layer) made of polypropylene on an inner periphery surface of a layer made of polyamide resin. However, adhesiveness between the both layers is poor; therefore the both layers could not be directly bonded without an adhesive (free of adhesive). Then, as a result of further experiments, the present inventors found that the use of maleic anhydride-modified polypropylene obtained by modifying polypropylene with maleic anhydride can realize a direct bond between an inner layer including maleic anhydride-modified polypropylene as a main component and an intermediate layer including polyamide resin as a main component without an adhesive (free of adhesive) and results in excellent bend resistance property, and completed the present invention.

As described above, the tubular inner layer in contact with a fluorine refrigerant of the refrigerant-transporting hose according to the present invention is made of an inner layer material including maleic anhydride-modified polypropylene as a main component. Thus, the inner layer is excellent in interlayer adhesiveness with the intermediate layer made of an intermediate layer material including polyamide resin as a main component. The both layers can be directly bonded with each other without an adhesive (free of adhesive). In addition, the tubular inner layer in contact with a fluorine refrigerant includes as a main component polypropylene with excellence in acid resistance property. Accordingly, even if acid is generated due to degradation of a fluorine refrigerant, infiltration of the acid into the intermediate layer including polyamide resin as a main component can be suppressed. The refrigerant-transporting hose according to the present invention therefore can prevent cracking of the hose due to decomposition of an amide bond and is excellent in bend resistance property.

In addition, if the modification amount of the maleic anhydride-modified polypropylene is 0.26 to 0.36 weight %, interlayer adhesiveness and bend resistance property of the refrigerant-transporting hose according to the present invention are further improved.

Further, if the melting point of the maleic anhydride-modified polypropylene is 165 to 168° C., interlayer adhesiveness and bend resistance property of the refrigerant-transporting hose according to the present invention are still further improved.

Then, when the rubber layer is a butyl rubber layer, water blocking property (water barrier property) of the refrigerant-transporting hose according to the present invention is further improved.

In addition, when the rubber layer is an ethylene-propylene rubber layer, heat resistance property of the refrigerant-transporting hose according to the present invention is further improved.

BRIEF DESCRIPTION OF DRAWINGS

FIG. 1 is a perspective view illustrating a schematic configuration of a refrigerant-transporting hose according to the present invention.

DESCRIPTION OF EMBODIMENTS

Next, embodiments of the present invention will be described in detail. However, the present invention is not limited to the embodiments.

A refrigerant-transporting hose according to the present invention includes, for example, as shown in FIG. 1, an intermediate layer 2 directly formed on an outer periphery surface of an inner layer 1, and an inner rubber layer 3, a reinforcement layer 4, and an outer rubber layer 5 sequentially formed on an outer periphery surface the inner layer 1.

The present invention has following features: the inner layer 1 is made of a inner layer material including maleic anhydride-modified polypropylene as a main component; the intermediate layer 2 is made of a intermediate layer material including polyamide resin as a main component; and the inner layer 1 and the intermediate layer 2 are subjected to an interlayer bond without an adhesive layer (free of adhesive). These are the most distinctive features of the present invention.

Next, these components will be described.

<<Inner Layer>>

The tubular inner layer 1 in contact with a fluorine refrigerant is made of an inner layer material including maleic anhydride-modified polypropylene as a main component.

In the present invention, "inner layer material including maleic anhydride-modified polypropylene as a main component" means that maleic anhydride-modified polypropylene makes up over half of the inner layer material. This also includes the case where the inner layer material only includes maleic anhydride-modified polypropylene.

The inner layer 1 made of the inner layer material including maleic anhydride-modified polypropylene as a main component is the innermost layer that is in contact with a fluorine refrigerant. If a layer including unmodified polypropylene as a main component is formed on an inner periphery surface of the inner layer 1, there occurs a problem such as insufficient adhesion between the inner layer 1 (layer including modified polypropylene as a main component) and the layer including unmodified polypropylene as a main component. As a result, problems including delamination, degradation of bend resistance property, and the like occur.

<Maleic Anhydride-Modified Polypropylene>

The modification amount of the maleic anhydride-modified polypropylene is preferably 0.26 to 0.36 weight %, more preferably, 0.26 to 0.28 weight %. That is, if the modification amount of the maleic anhydride-modified polypropylene is too small, interlayer adhesiveness tends to be degraded. On the other hand, if the modification amount of the maleic anhydride-modified polypropylene is too large, heat resistance property tends to be poor.

In addition, the melting point of the maleic anhydride-modified polypropylene is preferably 165 to 168° C. That is, if the melting point of the maleic anhydride-modified polypropylene is too low, heat resistance property tends to be poor. On the other hand, if the melting point of the maleic anhydride-modified polypropylene is too high, interlayer adhesiveness tends to be degraded.

If needed, the inner layer material may be suitably mixed with a filler, a plasticizer, a retrograde inhibitor, an antioxidant, a softening component, a heat resistant agent, and the like in addition to the maleic anhydride-modified polypropylene.

<<Intermediate Layer>>

The intermediate layer 2 that is directly formed on the outer periphery surface of the tubular inner layer 1 is made of an intermediate layer material including polyamide resin as a main component.

In the present invention, "intermediate layer material including polyamide resin as a main component" means that the polyamide resin makes up over half of the intermediate layer material. This also includes the case where the intermediate layer material only includes polyamide resin.

<Polyamide Resin>

Examples of the polyamide resin include polyamide 6 (PA6), polyamide 46 (PA46), polyamide 66 (PA66), polyamide 92 (PA92), polyamide 99 (PA99), polyamide 610 (PA610), polyamide 612 (PA612), polyamide 1010 (PA1010), polyamide 11 (PA11), polyamide 912 (PA912), polyamide 12 (PA12), copolymer of polyamide 6 and polyamide 66 (PA6/66), copolymer of polyamide 6 and polyamide 12 (PA6/12), and aromatic nylon. These substances may be used alone or in combination of two or more. Among these substances, polyamide 6 is preferred because polyamide 6 is excellent in interlayer adhesiveness and low refrigerant permeability.

If needed, the intermediate layer material may be suitably mixed with a filler, a plasticizer, a retrograde inhibitor, an antioxidant, a softening component, a nucleating agent, a heat resistant agent, and the like in addition to polyamide resin.

<<Rubber Layer>>

Examples of a main polymer (base material) of the inner rubber layer 3 and the outer rubber layer 5 (hereinafter, both rubber layers are also referred to as "rubber layer") include diene rubber, such as butyl rubber and ethylene-propylene rubber [ethylene-propylene-diene terpolymer rubber (EPDM) and ethylene-propylene copolymer rubber (EPM)]. These substances may be used alone or in combination of two or more. Among these substances, butyl rubber is preferred because of the water blocking property (water barrier property) and ethylene-propylene rubber is preferred because of the heat resistance property.

The rubber layer for the refrigerant-transporting hose according to the present invention is not limited to a two-layer structure (inner rubber layer 3 and outer rubber layer 5) shown in FIG. 1. The rubber layer may have a three-layer structure (inner rubber layer 3, intermediate rubber layer, and outer rubber layer 5), or a multilayer structure including four or more layers.

Specific examples of a combination for the rubber layer include a two-layer structure, for example, inner rubber layer 3 (butyl rubber layer)/outer rubber layer 5 (EPDM rubber layer), inner rubber layer 3 (EPDM rubber layer)/outer rubber layer 5 (EPDM rubber layer), and inner rubber layer 3 (EPM rubber layer)/outer rubber layer 5 (EPDM rubber layer), and a three-layer structure, for example, inner rubber layer 3 (EPM rubber layer)/intermediate rubber layer (EPDM rubber layer)/outer rubber layer 5 (EPDM rubber layer). An EPM rubber layer may be used for the outer rubber layer 5.

<Butyl Rubber>

For example, butyl rubber (IIR) or halogenated butyl rubber is used as the butyl rubber. These substances may be used alone or in combination of two or more. For example, chlorinated butyl rubber (Cl-IIR) or brominated butyl rubber (Br-IIR) is used as the halogenated butyl rubber.

<Ethylene-Propylene Rubber>

Examples of the ethylene-propylene rubber include ethylene-propylene-diene terpolymer rubber (EPDM) and ethylene-propylene copolymer rubber (EPM).

The diene monomer (third component) included in the EPDM may be preferably a diene monomer having 5 to 20 carbon atoms. Specific examples include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, and 2-isopropenyl-5-norbornene. Among these diene monomers (third components), dicyclopentadiene (DCP) and 5-ethylidene-2-norbornene (ENB) are preferred.

If needed, a rubber layer material (rubber composition) that forms the rubber layers 3 and 5 may be suitably mixed with a resin cross-linking agent, a resorcinol compound (an adhesive component), a melamine compound (an adhesive component), carbon black, a filler, a softening agent, a tackifier, a processing aid agent, and the like in addition to the main polymer such as butyl rubber.

<Resin Cross-Linking Agent>

An example of the resin cross-linking agent is a formaldehyde condensation product of alkylphenol. A specific example of the resin cross-linking agent is an alkylphenol/formaldehyde condensation product (TACKIROL 201MB35, manufactured by Taoka Chemical Co., Ltd.).

The content of the resin cross-linking agent is preferably 20 to 40 parts by weight with respect to 100 parts by weight of the main polymer such as the butyl rubber.

<Resorcinol Compound (Adhesive Component)>

Examples of the resorcinol compound include a resorcinol compound that mainly functions as an adhesive such as modified resorcin/formaldehyde resin, resorcin, and resorcin/formaldehyde (RF) resin. These substances may be used alone or in combination of two or more. Among these substances, modified resorcin/formaldehyde resin is preferably used because of transpiration property and compatibility with rubber.

Examples of the modified resorcin/formaldehyde resin include substances represented by the following general formulas (1) to (3). These substances may be used alone or in combination of two or more. Among these substances, the substance represented by the general formula (1) is particularly preferred.

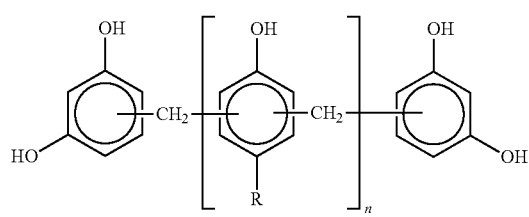
(1)

(where R represents a hydrocarbon group and n is an integer)

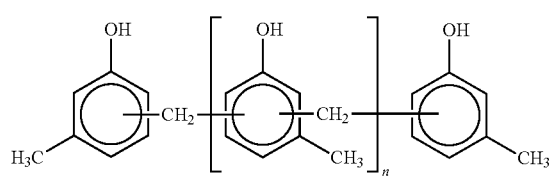
(2)

(where n is an integer)

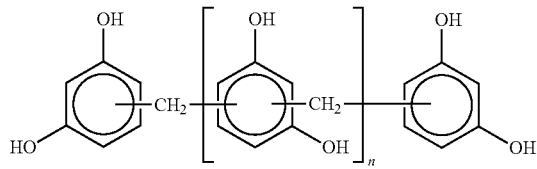
(3)

(where n is an integer)

The content of the resorcinol compound is preferably in a range of 0.1 to 10 parts by weight, more preferably in a range of 0.5 to 5 parts by weight with respect to 100 parts by weight of the main polymer such as the butyl rubber.

<Melamine Compound (Adhesive Component)>

Examples of the melamine compound include a methylated formaldehyde/melamine polymer and hexamethylenetetramine. These substances may be used alone or in combination of two or more. These substances are decomposed under heating at the time of cross-linkage to supply formaldehyde to the system. Of these substances, the methylated formaldehyde/melamine polymer is preferred because of low volatility and excellent compatibility with rubber.

As an example of the methylated formaldehyde/melamine polymer, the substance represented by the following general formula (4) is preferred. In particular, a mixture including 43 to 44 weight % of a compound of n=1, 27 to 30 weight % of a compound of n=2, and 26 to 30 weight % of a compound of n=3 in the general formula (4) is preferred.

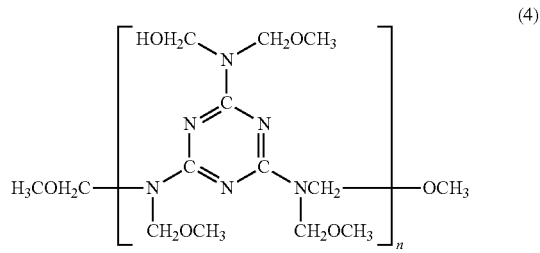
(4)

(where n is an integer)

The content of the melamine compound is preferably equal to or less than 5 parts by weight with respect to 100 parts by weight of the main polymer such as the butyl rubber.

The ratio of the resorcinol compound and the melamine compound in the mixture is preferably in a range of 1:0.5 to 1:2 in weight ratio, more preferably in a range of 1:0.77 to 1:1.5.

<Carbon Black>

Examples of the carbon black include SAF class, ISAF class, HAF class, MAF class, FEF class, GPF class, SRF class, FT class, and MT class. These substances may be used alone or in combination of two or more.

The content of the carbon black is preferably in a range of 30 to 150 parts by weight with respect to 100 parts by weight of the main polymer such as the butyl rubber.

<Filler>

An example of the filler is an inorganic compound derived from a mineral such as talc and mica. These substances may be used alone or in combination of two or more.

The content of the filler is preferably in a range of 1 to 200 parts by weight with respect to 100 parts by weight of the main polymer such as the butyl rubber.

<Softening Agent>

Examples of the softening agent include a petroleum softening agent such as process oil, lubricant oil, paraffin, liquid paraffin, petroleum asphalt, and petroleum jelly, a fatty oil softening agent such as castor oil, linseed oil, rapeseed oil, and palm oil, wax such as tall oil, vulcanized oil (factice), beeswax, carnauba wax, and lanolin, and linoleic acid, palmitin acid, stearin acid, and lauric acid. These substances may be used alone or in combination of two or more.

The content of the softening agent is preferably equal to or less than 40 parts by weight with respect to 100 parts by weight of the main polymer such as the butyl rubber.

The rubber layer material (rubber composition) can be prepared by mixing and kneading components by a roller or the like.

<<Reinforcement Layer>>

An example of a material for forming the reinforcement layer 4 to be used includes a reinforcement wire such as polyethylene terephthalate (PET), polyethylene naphthalate (PEN), aramid, polyamide, vinylon, rayon, and a metal wire. The reinforcement layer 4 can be made by weaving the reinforcement wire by spiral weaving, braid weaving, knit weaving, and the like.

Next, a method for manufacturing a refrigerant-transporting hose according to the present invention will be described. That is, first, an inner layer material including polypropylene as a main component and an intermediate layer material including polyamide resin as a main component are prepared, respectively. In addition, a main polymer such as butyl rubber is mixed with other components at a certain ratio and then kneaded to prepare a rubber layer material (an inner rubber layer material and an outer rubber layer material). Next, the inner layer material and the intermediate layer material are extruded on a mandrel in a hose-like shape to form an intermediate layer 2 on an outer periphery surface of an inner layer 1. Incidentally, a mandrel may not be used as appropriate. Next, the inner rubber layer material is extruded on an outer periphery surface of the intermediate layer 2 to form an inner rubber layer 3. Subsequently, a reinforcement wire such as a PET thread is weaved on an outer periphery surface thereof by braid weaving or the like to form a reinforcement layer 4. Further, the outer rubber layer material is extruded on an outer periphery surface of the reinforcement layer 4 to form an outer rubber layer 5, and vulcanization is then carried out under a certain condition. In this manner, a refrigerant-transporting hose, in which the intermediate layer 2 is directly formed on the outer periphery surface of the inner layer 1, and the inner rubber layer 3, the reinforcement layer 4, and the outer rubber layer 5 are sequentially formed on the outer periphery surface thereof (see FIG. 1), can be made.

The inner diameter of a refrigerant-transporting hose according to the present invention is preferably in a range of 5 to 40 mm. In addition, the thickness of the inner layer 1 is preferably in a range of 0.02 to 2 mm. The thickness of the intermediate layer 2 is preferably in a range of 0.02 to 2 mm. The thickness of the rubber layers 3 and 5 is preferably in a range of 0.5 to 5 mm.

The structure of a refrigerant-transporting hose according to the present invention is not limited to the structure shown in FIG. 1; however, as described above, the rubber layer may employ a structure including three or more layers, for example, a layer structure of inner layer/intermediate layer/inner rubber layer/reinforcement layer/intermediate rubber layer/reinforcement layer/outer rubber layer.

EXAMPLES

Next, examples will be described together with a comparative example. However, the present invention is not limited to these examples.

Prior to describing the examples and the comparative example, an inner layer material and an intermediate layer material described below were prepared.

[Maleic Anhydride-Modified Polypropylene (for Example)]

<Modified PP (i)>

ADMER QF500, manufactured by Mitsui Chemicals, Inc. (modification amount 0.27 weight %, melting point 165° C.)

<Modified PP (ii)>

ADMER QF551, manufactured by Mitsui Chemicals, Inc. (modification amount 0.36 weight %, melting point 135° C.)

<Modified PP (iii)>

ADMER QB510, manufactured by Mitsui Chemicals, Inc. (modification amount 0.28 weight %, melting point 160° C.)

<Modified PP (iv)>

MODIC P-502, manufactured by Mitsubishi Chemical Corporation (modification amount 0.26 weight %, melting point 168° C.)

[Unmodified Polypropylene (for Comparative Example)]

Unmodified PP [FS2011C, manufactured by Sumitomo Chemical Co., Ltd. (melting point 170° C.)]

[Polyamide Resin]

Polyamide 6 (PA6) (NYLON 6 1018I, manufactured by Ube Industries, Ltd.)

Also, a rubber layer material (rubber composition) described below was prepared.

[Preparation of Butyl Rubber Composition]

To prepare a butyl rubber composition, 100 parts by weight of brominated butyl rubber (Br-IIR) (BROMOBUTYL 2222, manufactured by JSR Corporation), 1 part by weight of stearic acid (LUNAC S30, manufactured by Kao Corporation), 20 parts by weight of FEF class carbon black (SEAST SO, manufactured by Tokai Carbon Co., Ltd.), 100 parts by weight of talc (MICRO ACE K-1, manufactured by Nippon Talc Co., Ltd.), 10 parts by weight of naphthene oil that is a softening agent (DIANA PROCESS NM-300, manufactured by Idemitsu Kosan Co., Ltd.), and 30 parts by weight of a resin cross-linking agent (TACKIROL 201MB35, manufactured by Taoka Chemical Co., Ltd.) were mixed and kneaded by a Banbury mixer (manufactured by Kobe Steel, Ltd.) and a roller (manufactured by Nippon Roll MFG. Co., Ltd.).

[Preparation of EPDM Rubber Composition]

To prepare an EPDM rubber composition, 100 parts by weight of EPDM (ESPRENE 501A, manufactured by Sumitomo Chemical Co., Ltd.), 100 parts by weight of carbon black (SEAST SO, manufactured by Tokai Carbon Co., Ltd.), 60 parts by weight of process oil (DIANA PROCESS PW-380, manufactured by Idemitsu Kosan Co., Ltd.), 4.2 parts by weight of di-t-butylperoxy-diisopropylbenzene (PEROXYMON F-40, manufactured by NOF Corporation) as a peroxide cross-linking agent, 1 part by weight of modified resorcin/formaldehyde resin represented by the general formula (1) (SUMIKANOL 620, manufactured by Sumitomo Chemical Co., Ltd.) as a resorcinol compound, and 0.77 parts by weight of a methylated formaldehyde/melamine polymer (SUMIKANOL 507A, manufactured by Sumitomo Chemical Co., Ltd.) as melamine resin were mixed and kneaded by a Banbury mixer (manufactured by Kobe Steel, Ltd.) and a roller (manufactured by Nippon Roll MFG. Co., Ltd.).

[Preparation of EPM Rubber Composition]

An EPM rubber composition was prepared in the same manner as the EPDM rubber composition except that EPM (ESPRENE 201, manufactured by Sumitomo Chemical Co., Ltd.) is used instead of the EPDM (ESPRENE 501A, manufactured by Sumitomo Chemical Co., Ltd.).

Examples 1 to 6

A hose was made by using an inner layer material, an intermediate layer material, and a rubber composition (a inner rubber layer material and a outer rubber layer material) shown in Table 1 below. That is, the inner layer material and the intermediate layer material were extruded on a mandrel (outer diameter 12 mm) made of TPX (manufactured by Mitsui Chemicals, Inc.) in a hose-like shape to form an intermediate layer on an outer periphery surface of an inner layer. Next, the inner rubber layer material was extruded on an outer periphery surface of the intermediate layer to form an inner rubber layer. Subsequently, a reinforcement layer was formed on an outer periphery surface thereof by braid weaving of a PET thread. Further, the outer rubber layer material was extruded on an outer periphery surface of the reinforcement layer to form an outer rubber layer. Then, this was vulcanized (170° C.×30 minutes). Subsequently, a hose (inner diameter 12.0 mm), in which an inner layer (thickness 0.1 mm), an intermediate layer (thickness 0.1 mm), an inner rubber layer (thickness 1.0 mm), a reinforcement layer, and an outer rubber layer (thickness 2.0 mm) are sequentially formed, was made by cutting a long laminated hose into desired length.

Comparative Example 1

A hose was made in accordance with the first example except that unmodified polypropylene [FS2011C (melting point 170° C.), manufactured by Sumitomo Chemical Co., Ltd.] was used instead of maleic anhydride-modified polypropylene as an inner layer material.

The hoses thus obtained according to the first to sixth examples and the first comparative example were subjected to evaluation of each property in accordance with the following criteria. The results are also shown in Table 1 above.

[Refrigerant/Refrigerant Oil Resistance Property]

Both ends of a hose having the length of approximately 400 mm was swaged by an aluminum clamp to include 6 g of a refrigerant (HFC-134a), approximately 13 g of refrigerant oil (DAPHNE HERMETIC OIL NF, manufactured by Idemitsu Kosan Co., Ltd.), and 15,000 ppm of water (distilled water), and an aging treatment was then carried out at a certain temperature for a certain period of time (120° C.×500 hours, 150° C.×168 hours). Subsequently, the hose was cut into half, and visually examined to determine whether any crack developed.

<Evaluation>
Excellent: No crack
Good: No crack after the static evaluation, and no crack until bent at 180°
Poor: There is a crack

[Interlayer Adhesiveness]

Both ends of a hose having the length of approximately 400 mm was swaged by an aluminum clamp to include 6 g of a refrigerant (HFC-134a), approximately 13 g of refrigerant oil (DAPHNE HERMETIC OIL NF, manufactured by Idemitsu Kosan Co., Ltd.), and 15,000 ppm of water (distilled water), and an aging treatment was then carried out at a certain temperature for a certain period of time (120° C.×500 hours, 150° C.×168 hours). Subsequently, the hose was cut into half, and then visually examined whether the resin layer (the inner layer and the intermediate layer) delaminated (floated).

<Evaluation>
Good: No delamination
Not good: No delamination, but the resin layer can be delaminated if forcibly separated by a hand
Poor: There is a delamination From the result shown in Table 1 above, interlayer adhesiveness between the inner layer and the intermediate layer was excellent, and refrigerant/refrigerant oil resistance property was also favorable in the first to sixth examples, since polypropylene of the inner layer material was maleic anhydride-modified polypropylene. Incidentally, the first and fourth to sixth examples, in which maleic anhydride-modified polypropylene with the modification amount in a range of 0.26 to 0.36 weight % and the melting point in a range of 165 to 168° C. was used, demonstrated much more favorable refrigerant/refrigerant oil resistance property under high-temperature conditions (150° C.×168 hours) than the second and third examples, in which maleic anhydride-modified polypropylene with the melting point beyond the above range was used.

On the other hand, the first comparative example was inferior in interlayer adhesiveness between the inner layer and the intermediate layer since polypropylene of the inner layer material was unmodified polypropylene.

TABLE 1

|  | Examples | | | | | | Comparative |
|---|---|---|---|---|---|---|---|
|  | 1 | 2 | 3 | 4 | 5 | 6 | Example 1 |
| Inner layer material | Modified PP(i) | Modified PP(ii) | Modified PP(iii) | Modified PP(iv) | Modified PP(i) | Modified PP(i) | Unmodified PP |
| Intermediate layer material | PA6 | PA6 | PA6 | PA6 | PA6 | PA6 | PA6 |
| Inner rubber layer material | Butyl rubber composition | Butyl rubber composition | Butyl rubber composition | Butyl rubber composition | EPM rubber composition | EPDM rubber composition | Butyl rubber composition |
| Reinforcement thread | PET thread | PET thread | PET thread | PET thread | PET thread | PET thread | PET thread |
| Outer rubber layer material | EPDM | EPDM | EPDM | EPDM | EPDM | EPDM | EPDM |
| Refrigerant/refrigerant oil resistance property | | | | | | | |
| 120° C. × 500H | Excellent | Excellent | Excellent | Excellent | Excellent | Excellent | Good |
| 150° C. × 168H | Excellent | Good | Good | Excellent | Excellent | Excellent | Good |
| Interlayer adhesiveness | | | | | | | |
| 120° C. × 500H | Good | Good | Good | Good | Good | Good | Poor |
| 150° C. × 168H | Good | Not good | Good | Good | Good | Good | Poor |

In the examples, specific embodiments of the present invention are described. However, these examples are only illustrative and should not be construed as restrictive. All changes which come within the meaning and range of equivalency of the claims are therefore intended to be embraced therein.

INDUSTRIAL APPLICABILITY

A refrigerant-transporting hose according to the present invention is used for an air conditioner hose that transports a fluorine refrigerant such as Freon and alternative Freon. Such a refrigerant-transporting hose can be used not only in automobiles but also for other transportation machines (including airplanes, industrial transport vehicles such as forklifts, loading shovels, and cranes, and rail cars) and the like.

REFERENCE SIGNS LIST

1 Inner layer
2 Intermediate layer
3 Inner rubber layer
4 Reinforcement layer
5 Outer rubber layer

The invention claimed is:

1. A refrigerant-transporting hose, comprising:
a fluorine refrigerant-conducting tubular inner layer;
an intermediate layer formed on an outer periphery of the inner layer; and
at least one rubber layer formed on a further outer periphery of the intermediate layer,
wherein the inner layer is made of an inner layer material including maleic anhydride-modified polypropylene as a main component, and
wherein the intermediate layer is made of an intermediate layer material including polyamide resin as a main component.

2. The refrigerant-transporting hose according to claim 1, wherein
a modification amount of the maleic anhydride-modified polypropylene is 0.26 to 0.36 weight %.

3. The refrigerant-transporting hose according to claim 1, wherein a melting point of the maleic anhydride-modified polypropylene is 165 to 168° C.

4. The refrigerant-transporting hose according to claim 2, wherein a melting point of the maleic anhydride-modified polypropylene is 165 to 168° C.

5. The refrigerant-transporting hose according to claim 1, wherein the rubber layer is a butyl rubber layer.

6. The refrigerant-transporting hose according to claim 2, wherein the rubber layer is a butyl rubber layer.

7. The refrigerant-transporting hose according to claim 3, wherein the rubber layer is a butyl rubber layer.

8. The refrigerant-transporting hose according to claim 4, wherein the rubber layer is a butyl rubber layer.

9. The refrigerant-transporting hose according to claim 1, wherein the rubber layer is an ethylene-propylene rubber layer.

10. The refrigerant-transporting hose according to claim 2, wherein the rubber layer is an ethylene-propylene rubber layer.

11. The refrigerant-transporting hose according to claim 3, wherein the rubber layer is an ethylene-propylene rubber layer.

12. The refrigerant-transporting hose according to claim 4, wherein the rubber layer is an ethylene-propylene rubber layer.

13. The refrigerant-transporting hose according to claim 1, wherein the inner layer and the intermediate layer are directly bonded together without an adhesive.

14. The refrigerant-transporting hose according to claim 2, wherein the inner layer and the intermediate layer are directly bonded together without an adhesive.

15. The refrigerant-transporting hose according to claim 3, wherein the inner layer and the intermediate layer are directly bonded together without an adhesive.

16. The refrigerant-transporting hose according to claim 4, wherein the inner layer and the intermediate layer are directly bonded together without an adhesive.

17. The refrigerant-transporting hose according to claim 1, wherein the rubber layer further comprises at least one of a resorcinol compound and a melamine compound.

18. The refrigerant-transporting hose according to claim 2, wherein the rubber layer further comprises at least one of a resorcinol compound and a melamine compound.

19. The refrigerant-transporting hose according to claim 3, wherein the rubber layer further comprises at least one of a resorcinol compound and a melamine compound.

20. The refrigerant-transporting hose according to claim 4, wherein the rubber layer further comprises at least one of a resorcinol compound and a melamine compound.

* * * * *